W. VANDERLIP.
PERISCOPE.
APPLICATION FILED OCT. 19, 1915.
1,250,393.
Patented Dec. 18, 1917.
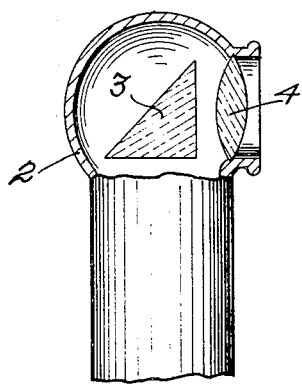
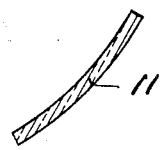
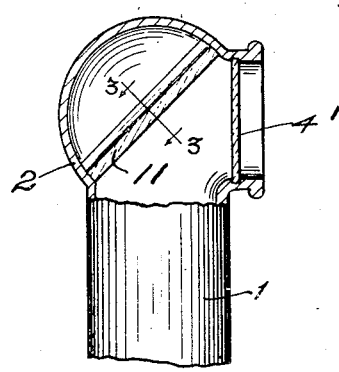
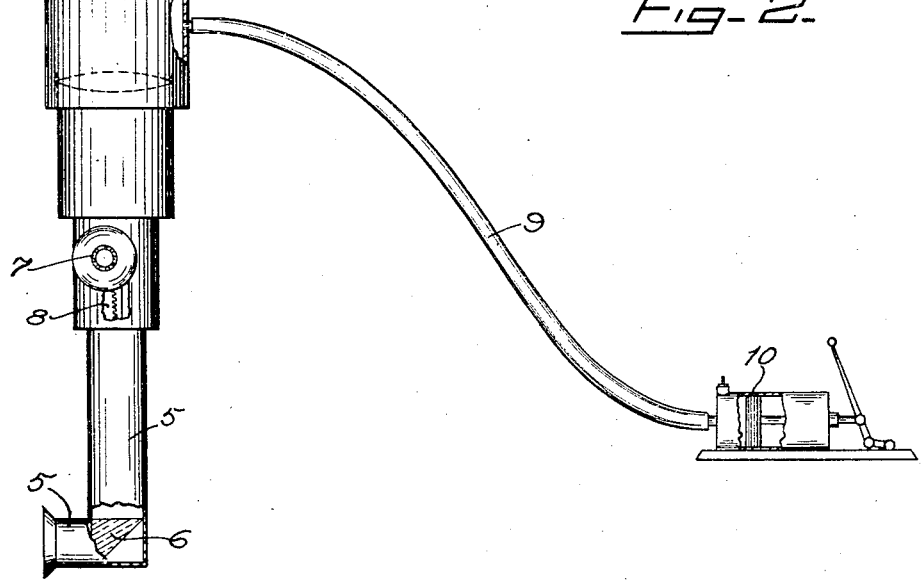
WITNESS
INVENTOR.
Washington Vanderlip
BY
Acker & Totten
ATTORNEYS.

UNITED STATES PATENT OFFICE.

WASHINGTON VANDERLIP, OF OAKLAND, CALIFORNIA, ASSIGNOR OF ONE-HALF TO CHARLES D. BIBBINS, OF OAKLAND, CALIFORNIA.

PERISCOPE.

1,250,393.  Specification of Letters Patent.  Patented Dec. 18, 1917.

Application filed October 19, 1915. Serial No. 56,721.

*To all whom it may concern:*

Be it known that I, WASHINGTON VANDERLIP, a citizen of the United States, residing at Oakland, in the county of Alameda and State of California, have invented certain new and useful Improvements in Periscopes, of which the following is a specification.

The present invention relates to periscopes and more particularly to the type of periscope adapted for use in submarines, but it is understood that the same is adaptable for general use.

Periscopes as now designed and in general use are constructed in such a manner that the image received at the upper end thereof is conveyed through a plurality of lenses to the eye piece at the lower end thereof. In this construction it is absolutely necessary that the several lenses be in absolute register to properly transmit the image and any vibration or movement out of alinement of the lenses will destroy the image in the periscope. In the present type of periscope it is difficult to carry the image any great distance from the hood, owing to the number of lenses required and the exactness of adjustment necessary of the same.

The present invention has for its principal objects to provide a periscope which can be manufactured at little cost and by the use of which the image may be taken from a greater height above the observer than is possible at present, thereby increasing the range of the periscope over those now in use; to provide a periscope wherein the lenses thereof, when subjected to a difference in temperatures, will be prevented from fogging or collecting moisture, and to provide a structure which contains but few lenses and which does not require the exactness in adjustment that is required in the present types.

My invention consists broadly in combining a telescope with a suitable objective member and arranging the two at a distance from each other, preferably in a tube whereby the image on the objective member may be readily brought to the eye of the observer by the use of the telescope.

In order to comprehend the invention, reference should be had to the accompanying sheet of drawings, in which—

Figure 1 is a broken side elevation in part section of the improved periscope, disclosing the means for giving adjustment to the eye piece thereof.

Fig. 2 is a broken section of the hood for the periscope, disclosing a mirror therein as a substitute for the prism disclosed in Fig. 1 of the drawings, as being contained within the hood.

Fig. 3 is a sectional view of the reflector illustrated in Fig. 2 and taken on line 3—3 thereof.

A suitable tube 1 is shown in Fig. 1 provided at its upper end with a hood or head-piece 2 in which is mounted a prism 3, which reflects the object from the outlet of the head-piece downwardly into the tube 1. At the entrance to the head-piece is arranged a suitable lens 4 which throws the light rays onto the vertical plane of the prism 3 so as to be reflected and form the image on the horizontal plane of said prism. The head-piece 2 forming the first element is flanged or secured in any suitable manner, not shown, to the second element or tube 1.

At the lower end of the tube 1 is positioned a suitable telescope 5 having the prismatic eye piece 6 to enable the observer to see in a horizontal direction and into the tube to view the image on the undersurface of the prism or reflector 3.

The telescope of the eye-piece, which latter forms the third element and is detachably connected with the tube 1 in any suitable manner is adjusted to suit the eye by the usual pinion 7 carried by one telescopic member and which intermeshes with the rack 8 carried by another member.

Communicating with the interior of the tube 1, which is closed at its opposite ends by the members, as in the drawings, and which is made as air tight as possible, is a tube 9 connected with a pump 10 for maintaining a vacuum within the tube and which prevents condensation forming on the respective lenses within the tube when the tube is subjected to differences in temperatures.

In the arrangement illustrated in Figs. 2 and 3 I employ a suitable spherical convex mirror in place of the prism or reflector 3. This convex mirror is indicated at 11 and to afford a suitable field of view, the one side of the tube 1 is cut away and replaced by a semi-circular or semi-cylindrical front of plate-glass 4' suitably secured to the tube 1. It will be observed that this transparent front 4' extends below the lower edge of the mirror 11. In this arrangement the lens 4 is not employed.

The ordinary spherical convex mirror (as employed for instance in automobile vehicles) shows a marked distortion. This mirror has to be set at an angle of 45° as in Fig. 2 of the drawings, to the line of sight and produces images in which the vertical dimension is compressed relatively to the horizontal dimension to the object observed, due to the fact that the vertical projection of an object is less than the horizontal projection would be of an object of equal length.

A suitable convex mirror for carrying out this invention would be a circular one of substantially five inches in diameter with the top or "zenith" of the domed portion raised about one-sixteenth to one-eighth inch above the level of the periphery. These dimensions are given only by way of example and are not to be regarded as of a limiting nature.

I am aware that it has been proposed to employ a curved reflecting surface such as a parabolic or spherical mirror in a periscope, but that arrangement employs a lens in the tube between the mirror and the eye-piece and does not employ a telescope or magnifying device.

In the modified form of structure I employ a suitable convex mirror 11 in place of the prism or reflector 3 and place a piece of plate glass over the opening in the hood 2 in place of the lens 4. The image as received on the mirror is viewed from the lower end of the tube 1 through the telescope, and the curvature of the mirror enables a greater radius of vision than if a flat mirror is employed.

I am aware that various changes may be made in the details of construction of the working parts before described without creating a departure from the invention, and I do not wish therefore to be understood as limiting the invention to said details of construction, but on the contrary wish to be understood as claiming the invention as broadly as the state of the art will permit.

Having thus described my invention, what I claim as new and desire to protect by Letters Patent is:—

A periscope consisting of three elements or sections including a head-piece, a viewing eye-piece comprising a telescope, and a prism or mirror, and an intermediate connecting member for rigidly holding said first mentioned elements together, said intermediate member being without lens or lens systems, substantially as described.

In testimony whereof I have signed my name to this specification in the presence of two subscribing witnesses.

WASHINGTON VANDERLIP.

Witnesses:
N. A. ACKER,
D. B. RICHARDS.